United States Patent

Shimokoriyama et al.

[11] Patent Number: 5,589,946
[45] Date of Patent: Dec. 31, 1996

[54] VIDEO SIGNAL REPRODUCTION APPARATUS REPLACING DROP-CUT SIGNAL PORTIONS

[75] Inventors: Makoto Shimokoriyama, Kawasaki; Akio Aoki, Tokyo; Masato Kato, Inagi, all of Japan

[73] Assignee: Canon Kabushiki Kaisha, Tokyo, Japan

[21] Appl. No.: 890,181

[22] Filed: May 29, 1992

[30] Foreign Application Priority Data

Jun. 7, 1991 [JP] Japan .................................. 3-163885

[51] Int. Cl.⁶ ............................. H04N 5/94; H04N 5/78
[52] U.S. Cl. ................................. 386/47; 386/51
[58] Field of Search ............................ 358/336, 314, 358/327, 328, 340, 36, 37, 167; 360/38.1; 348/607, 606, 533, 535

[56] References Cited

U.S. PATENT DOCUMENTS

| | | | |
|---|---|---|---|
| 4,651,230 | 3/1987 | Hagita et al. | 358/314 |
| 4,729,041 | 3/1988 | Kuroda | 358/336 |
| 4,994,924 | 2/1991 | Tenma | 358/336 |
| 5,111,304 | 5/1992 | Kinoshita et al. | 358/341 |
| 5,153,742 | 10/1992 | Rabii | 358/336 |

*Primary Examiner*—Thai Q. Tran
*Assistant Examiner*—Robert Chevalier
*Attorney, Agent, or Firm*— Fitzpatrick, Cella, Harper & Scinto

[57] ABSTRACT

An apparatus for reproducing, from a recording medium, a composite signal in which an image signal and a non-image signal are multiplexed on a time axis. The apparatus includes (a) a reproduction device for reproducing the composite signal from the recording medium; (b) a detection device, coupled to the reproduction device, for detecting a drop-out portion of the composite signal reproduced by the reproduction device; (c) a discrimination device, coupled to the reproduction device, for generating a discrimination signal to discriminate between an image signal portion and non-image signal portions of the composite signal reproduced by the reproduction device; and (d) a replacing device, coupled to the detection device and to the discrimination device, for replacing the drop-out portion of the composite signal with a corresponding replacement signal, reproduced a predetermined period of time before the composite signal, in response to (i) a detection of a drop-out portion by the detection device and, (ii) the discrimination signal generated by the discrimination device.

18 Claims, 6 Drawing Sheets

MULTI-ALLOCATION OF MUSE SIGNAL

VIDEO SIGNAL REPRODUCTION APPARATUS REPLACING DROP-CUT SIGNAL PORTIONS

BACKGROUND OF THE INVENTION

1. Field of the Invention

The present invention relates to a video signal reproduction apparatus for reproducing a video signal, and more particularly, to a video signal reproducing apparatus suited to reproduce a composite video signal, (like a MUSE signal, having an image region and a non-image region) from a recording medium and to restore the video signal.

2. Description of the Related Art

A VTR (video tape recorder) for recording and reproducing video signals generally employs the FM (frequency modulation) method, which is also used to record high-definition signals.

FIG. 1 shows a reproduction portion of a well-known type of VTR, and FIG. 2 shows the detailed construction of a drop-out compensator in FIG. 1. Referring to FIG. 1, a video signal reproduced by a head 40 is amplified by an amplifier 41, and a DC component is removed from the video signal by a HPF (high-pass filter) 42. The waveform of the video signal is equalized by an equalizer 43, and then the video signal is output to a drop-out compensator 44 which is illustrated in detail in FIG. 2. If a drop-out of the video signal arises from dust and so on between a tape and the head 40 in the reproduction process, the drop-out is compensated as a RF (high frequency) signal by the drop-out compensator 44.

The drop-out compensator 44 will now be explained with reference to FIG. 2. The RF signal equalized by the equalizer 43 is input through an input terminal 401, and the drop-out is detected by a drop-out detection circuit 402. The drop-out detection circuit 402 detects the drop-out by comparing an envelope level of the RF signal with a predetermined threshold level.

If the drop-out detection circuit 402 does not detect any drop-out, a flag output from the drop-out detection circuit 402 is set at "0", and the RF signal input through the input terminal 401 is selected by a selector 403 and output through a 1H delay line 404. On the other hand, if the drop-out detection circuit 402 detects the drop-out, a flag output from the drop-out detection circuit 402 is set at "1", and a RF signal having a great correlation to an image on a previous line delayed by the 1H delay line 404 is selected by the selector 403 and output through the 1H delay line 404. The drop-out portion is thus compensated.

Returning to FIG. 1, the amplitude of the RF signal whose drop-out is compensated by the drop-out compensator 44 is limited by a limiter 45, the RF signal is demodulated by a FM demodulator 46, and a high-frequency component is removed from the RF signal by a LPF (low-pass filter) 47. Subsequently, a frequency region emphasized in recording is returned to an initial level by a de-emphasis circuit 48, noise is removed by a noise reduction circuit 49, and the RF signal is output as a video signal.

However, if the drop-out is detected in the above conventional video signal reproduction apparatus, compensation is performed by a signal having a great correlation to the image in the previous line. Therefore, when a MUSE signal is reproduced, since the MUSE signal includes signals having no correlation between lines, such as an audio signal, control signals, and VITS (vertical interval test signals), besides image signals (C image, Y image) as shown in FIG. 3, the audio signal is also compensated by a signal in the previous line, and thus it is feared that an audio signal which should not be heard is output. However, if the above drop-out compensation is not performed, the image is remarkably deteriorated.

In particular, if a succession of drop-outs occurs in a plurality of lines in front of and behind a boundary between an audio signal and an image signal, the image signal is replaced with a signal other than an image signal. This case results in a great deterioration of an output image.

SUMMARY OF THE INVENTION

An object of the present invention is to solve the above problems.

Another object of the present invention is to provide a video signal reproduction apparatus capable of preventing image information from being deteriorated without any useless replacement of the image information with other information.

A further object of the present invention is to solve a problem that deterioration of an output image is caused by the replacement of an image signal with other information.

According to one aspect of the present invention, there is provided an apparatus for reproducing a composite signal (in which an image signal and another kind of signal are multiplexed on the time axis) from a recording medium, comprising a reproduction means for reproducing the composite signal from the recording medium, a detection means for detecting a drop-out of the signal reproduced by the reproduction means, a discriminating means for generating a signal to discriminate between an image signal portion and other portions in the composite signal reproduced by the reproduction means, and a replacing means for operating in response to an output of the detection means and an output of the discriminating means and replacing the composite signal reproduced by the reproduction means with a signal reproduced a predetermined period of time before.

According to another aspect of the present invention, an image signal reproducing apparatus includes reproduction means for reproducing, from a recording medium, a composite signal in which an image signal and a non-image signal are multiplexed on the time axis. Detection means are coupled to the reproduction means, for detecting a drop-out of said composite signal reproduced by the reproduction means. Discrimination means are also coupled to the reproduction means for generating a signal to discriminate between an image signal portion and non-image signal portions of said composite signal reproduced by the reproduction means. Replacing means are coupled to both the detection means and the discrimination means, for replacing the composite signal reproduced by said reproduction means with a signal reproduced a predetermined period of time before the composite signal only when the detection means detects dropout in said composite signal and said discrimination means discriminates an image signal portion.

According to another aspect of the present invention, an image signal reproducing apparatus includes reproduction means for reproducing, from a recording medium, a composite signal in which an image signal and a non-image are multiplexed on the time axis. Discrimination means are coupled to the reproduction means, for generating a signal to discriminate between an image signal portion and non-image signal portions of said composite signal reproduced by the reproduction means. Replacing means are also coupled to the reproduction means, for replacing the composite signal reproduced by said reproduction means with a signal reproduced a predetermined period of time before said composite signal in response to the discriminating means generating said signal when said image signal portion is detected in said composite signal.

Other objects and features of the present invention will be apparent from the following detailed description of embodiments taken in connection with the accompanying drawings.

DETAILED DESCRIPTION OF PREFERRED EMBODIMENTS

Preferred embodiments of the present invention will now be described with reference to the accompanying drawings.

Figure 4:
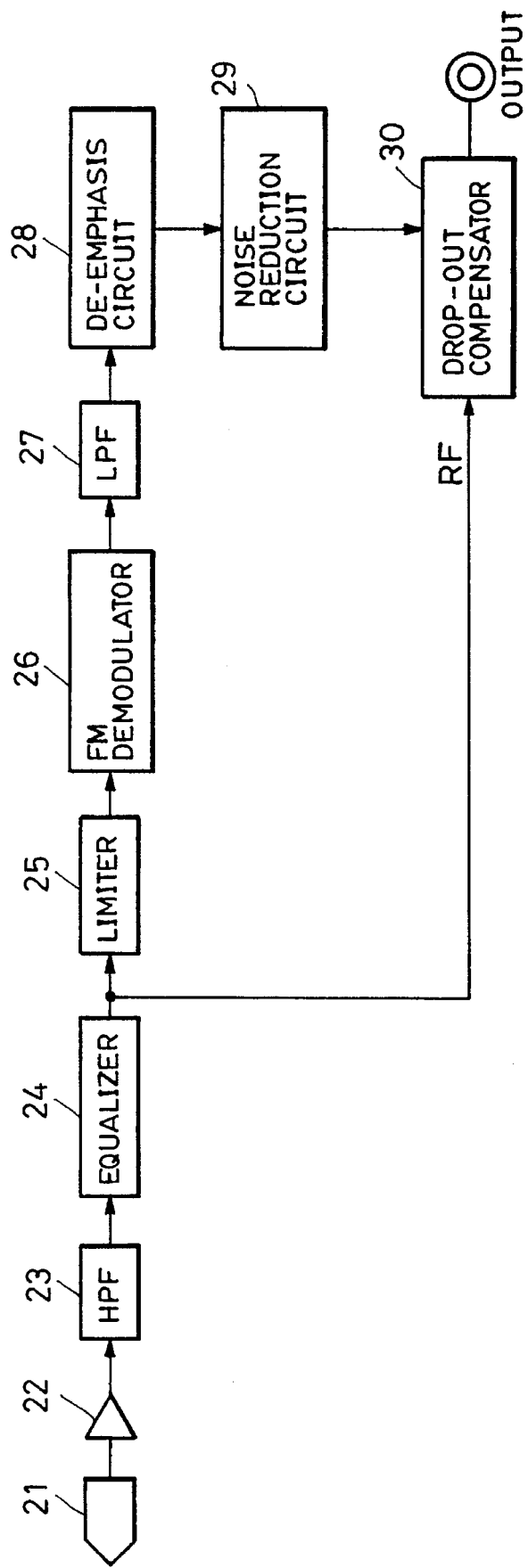
FIG. 4 is a block diagram showing the construction of a reproduction portion of a VTR according to an embodiment of the present invention.
Figure 5:
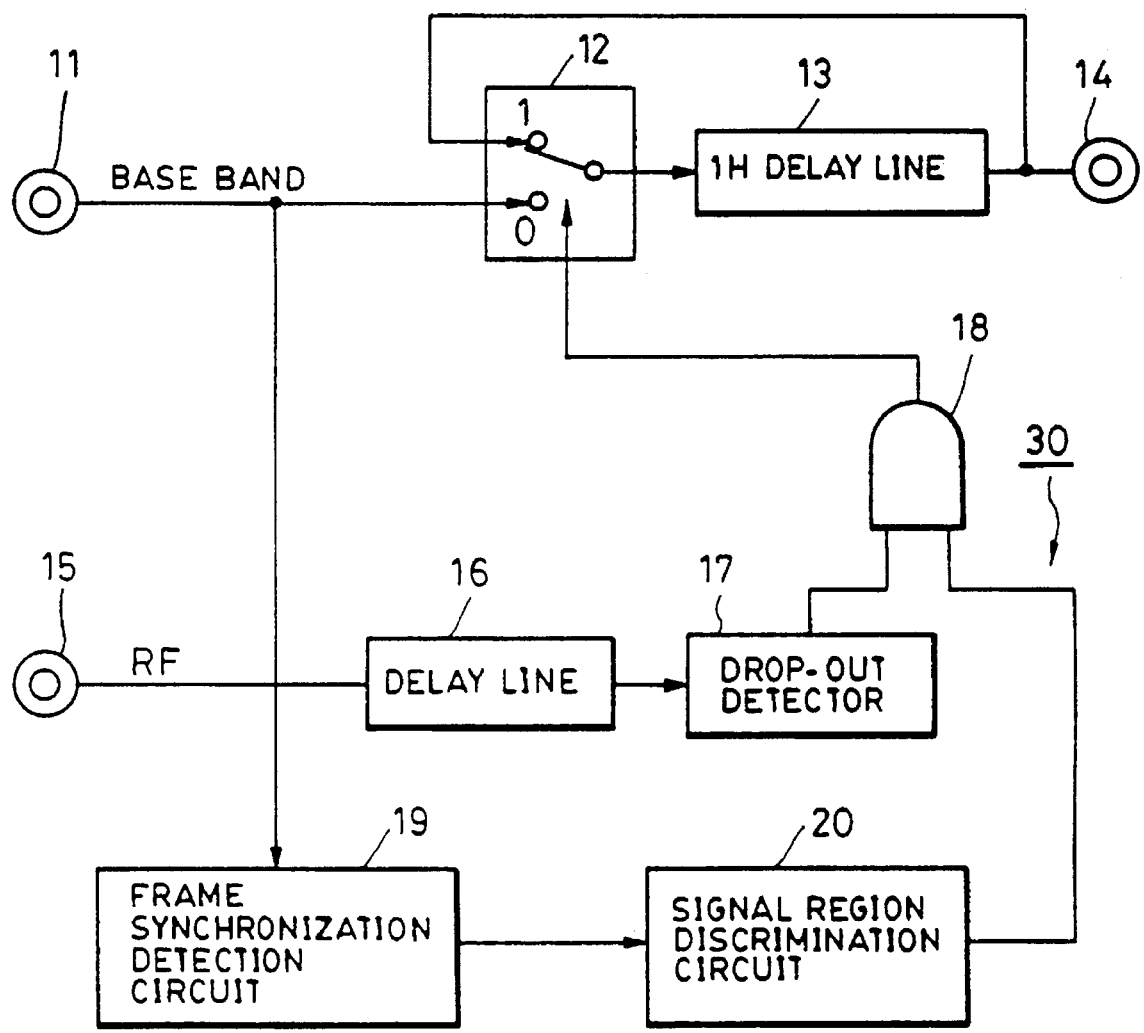
FIG. 5 is a block diagram showing the detailed construction of a drop-out compensator shown in FIG. 4.

FIG. 4 is a block diagram showing the construction of a reproduction portion of a VTR according to an embodiment of the present invention, and FIG. 5 is a block diagram showing the detailed construction of a drop-out compensator shown in FIG. 4.

First, the reproduction portion of the embodiment will be explained with reference to FIG. 4.

Figure 1:
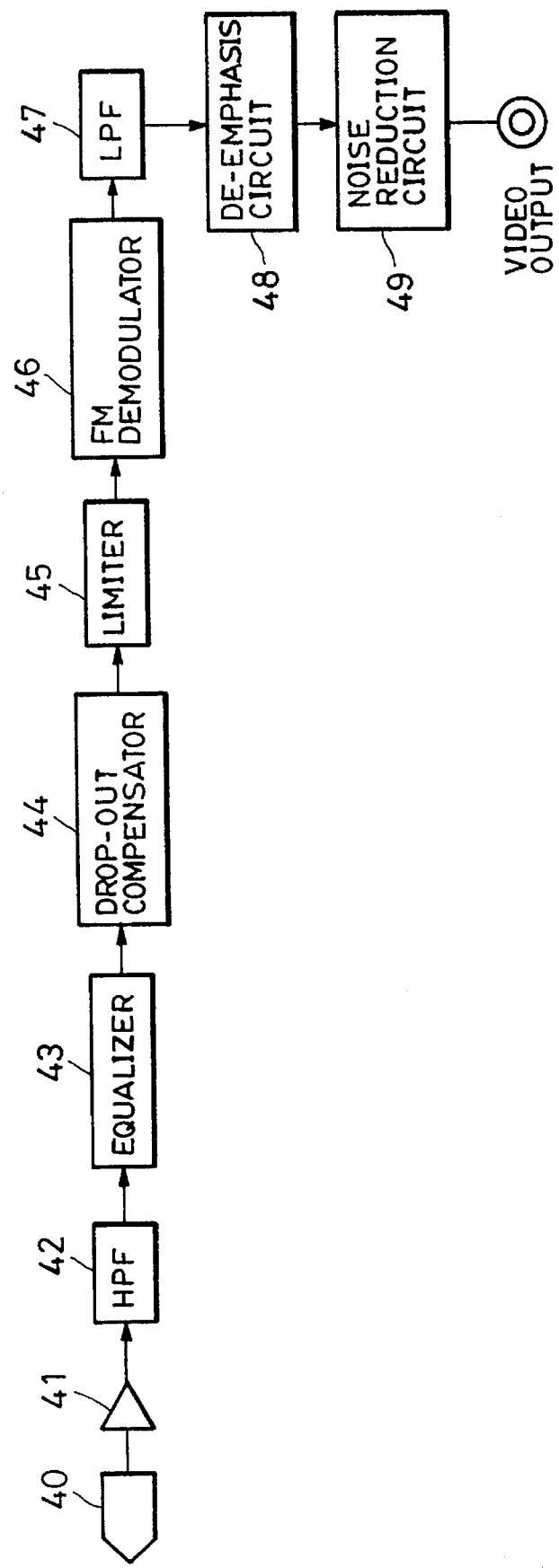
FIG. 1 is a block diagram showing the construction of a reproduction portion of a conventional VTR.
Figure 2:
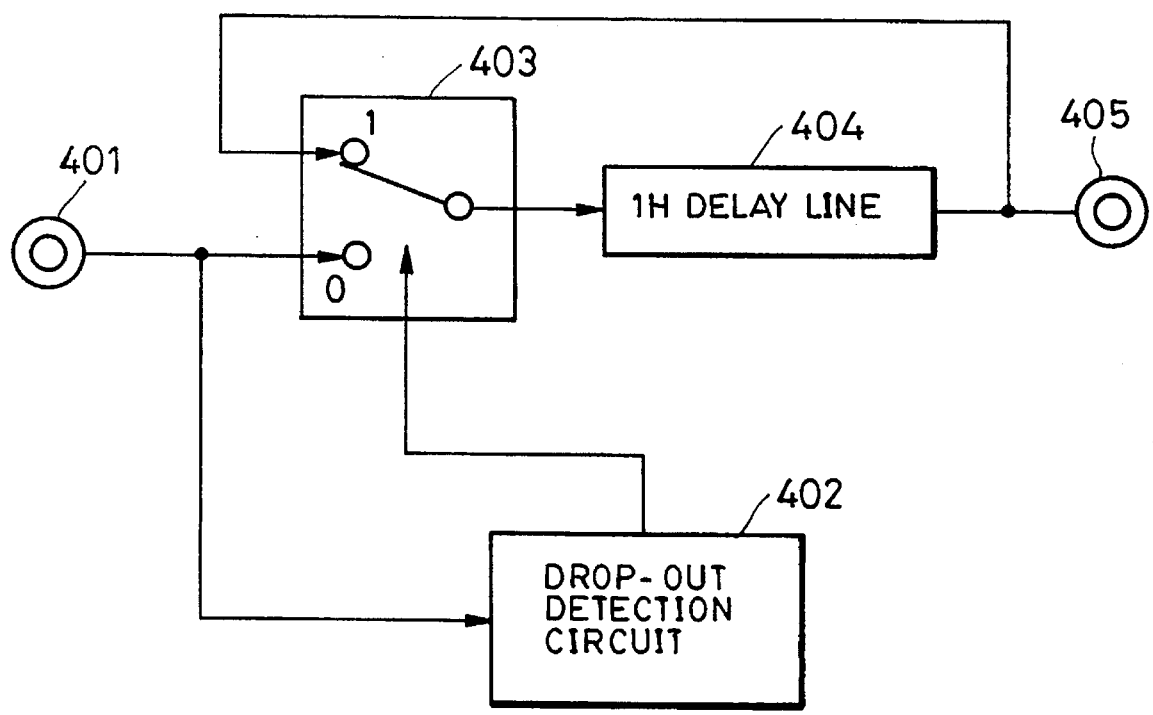
FIG. 2 is a block diagram showing the detailed construction of a drop-out compensator shown in FIG. 1.
Figure 3:
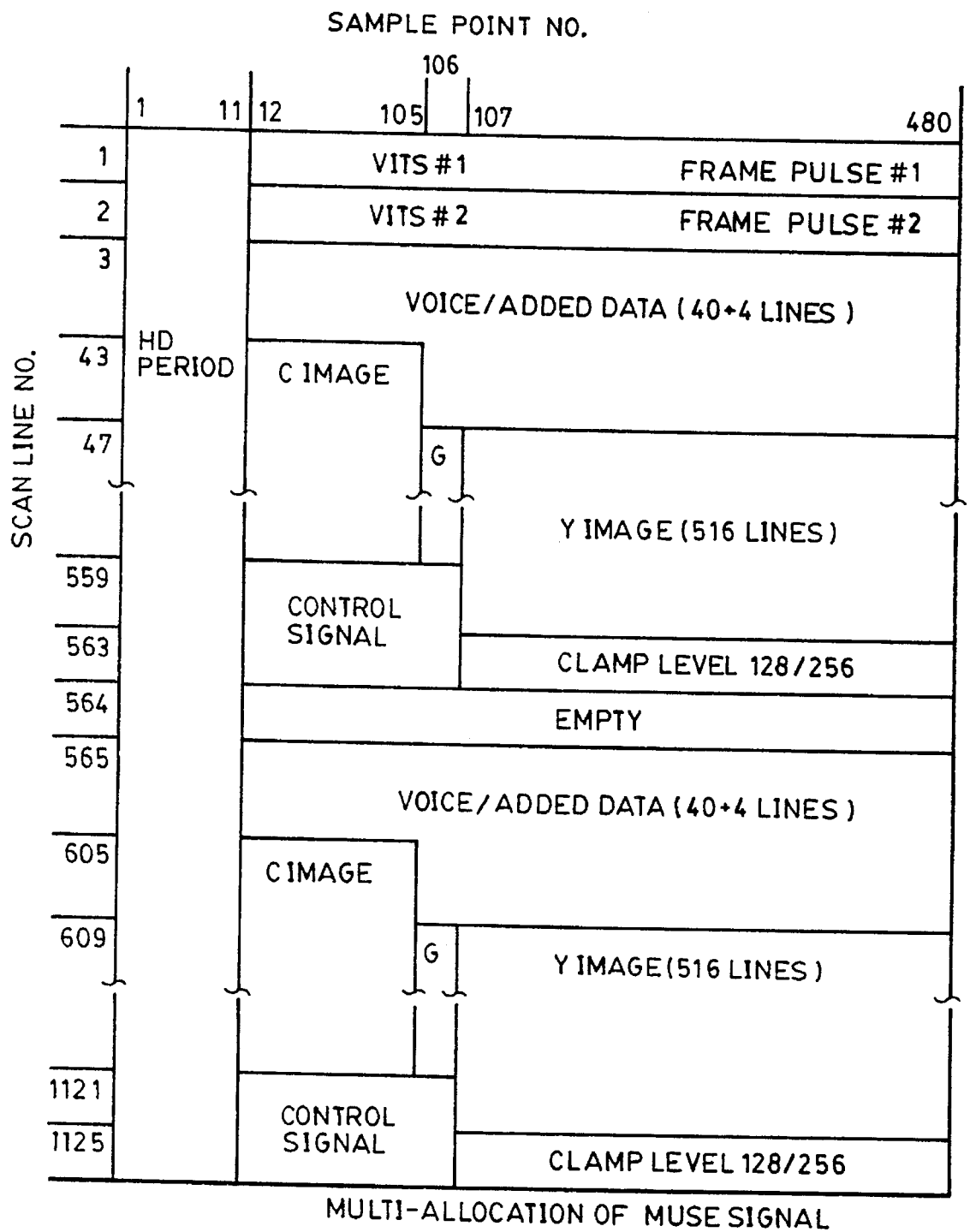
FIG. 3 is a view explaining the contents of a MUSE signal.

A MUSE signal, as shown in FIG. 3, is reproduced by a head 21, and amplified by an amplifier 22. Then, a DC component is removed from the signal by a HPF 23, the waveform of the signal is equalized by an equalizer 24, and the signal is output as a RF signal to a limiter 25 and a drop-out compensator 30 which is illustrated in detail in FIGS. 5 and 6.

The amplitude of the signal equalized by the equalizer 24 is limited by the limiter 25, the signal is demodulated to a base band signal by a FM demodulator 26, and a high-frequency component is removed from the signal by a LPF 27. Subsequently, an emphasized frequency region is de-emphasized by a de-emphasis circuit 28, noise is removed from the signal by a noise reduction circuit 29, and the signal is output as a base band signal to a drop-out compensator 30.

A detailed example of the construction of the drop-out compensator 30 will be explained with reference to FIG. 5. The base band signal output from the noise reduction circuit 29 in the reproduction portion of the VTR is input to one input terminal of a selector 12 through an input terminal 11. An output signal of the selector 12 is delayed by one line, that is, 480 data of the MUSE signal, by a 1H delay line 13 and output to the other input terminal of the selector 12 and an output terminal 14.

On the other hand, the RF signal from the equalizer 24 is delayed by a delay time of the base band signal with respect to the RF signal by a delay line 16, and then a drop-out of the MUSE signal resulting from dust between a tape and the head 11 is detected by a drop-out detector 17. The drop-out detector 17 outputs a detection signal "1" when detecting a drop-out by comparing an envelope of the RF signal and a threshold value, and outputs a detection signal "0" when it does not detect any drop-out. The detection signal is input to one input terminal of an AND gate 18.

The base band signal demodulated by the above VTR reproducing apparatus is also output to a frame synchronization detection circuit 19 by which a frame synchronization signal of the MUSE signal shown in FIG. 3 is detected. A signal region discrimination circuit 20 discriminates a region of an image signal (C image, Y image) of each frame of the base band MUSE signal input to the terminal 11 based on the frame synchronization signal from the frame synchronization detection circuit 19, and outputs a discrimination signal to the other input terminal of the AND gate 18.

The operations of the above embodiment will now be explained. Referring to FIG. 5, when the base band signal of the MUSE signal is input to the selector 12 and the frame synchronization detection circuit 19 and the RF signal is input to the delay line 16, the RF signal is delayed by the same time by which the base band signal is delayed by the circuitry from limiter 25 to the noise reduction circuit 29 shown in FIG. 4. Therefore, the base band signal and the RF signal are input in synchronization to the selector 12 and the drop-out detector 17, respectively. When a drop-out is caused by dust and so on between a tape and the head 11 in the reproduction process, the drop-out detector 17 detects the drop-out and outputs a signal "1" to one input terminal of the AND gate 18.

On the other hand, the signal region discrimination circuit 20 discriminates a region of an image signal (C image, Y image) of each frame based on the frame detection signal from the frame synchronization circuit 19, and outputs a discrimination signal "1" to the other input terminal of the AND gate 18. When both the drop-out detection circuit 17 and the signal region discrimination circuit 20 output the signals "1", an output signal of the AND gate 18 becomes "1", the selector 12 selects the base band signal delayed by the 1H delay line 13 and inputs the signal to the 1H delay line 13.

Therefore, according to the above embodiment, since the output signal of the AND gate 18 is "0" in a region of a signal having no correlation with the image, such as an audio signal, a control signal and a VITS, other than image signals (C image, Y image) of the MUSE signal as shown in FIG. 3, the selector 12 selects the input base band signal as it is. Accordingly, the audio signal and so on are not compensated uselessly and thus not deteriorated. Furthermore, even if a succession of drop-outs occurs in a plurality of lines near a boundary between an audio signal and an image signal, the image signal is not deteriorated.

Figure 6:
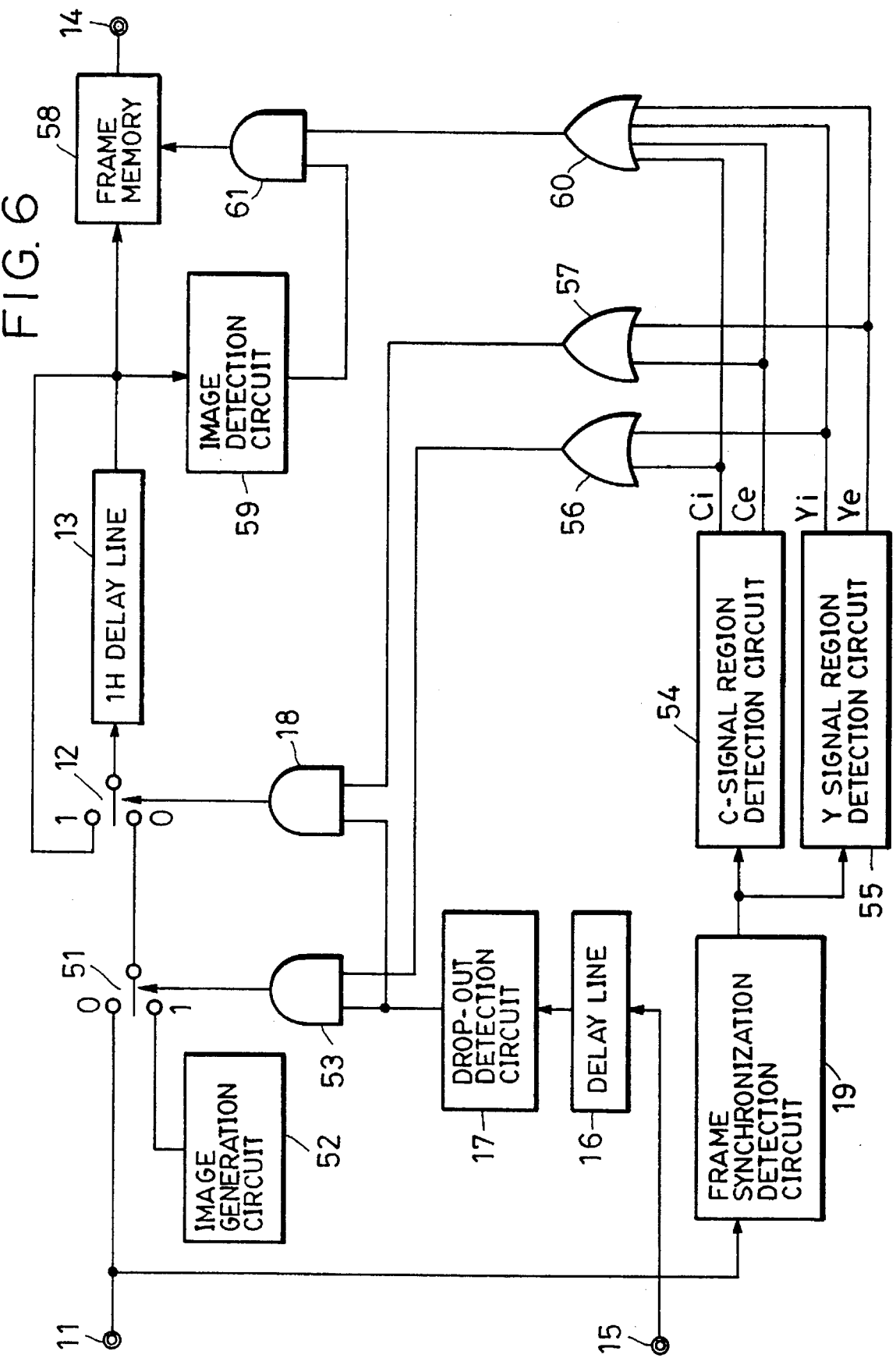
FIG. 6 is a block diagram showing another detailed construction of the drop-out compensator shown in FIG. 4.

FIG. 6 is a block diagram showing another construction of the drop-out compensator 30 shown in FIG. 4. In the drawing, components equivalent to those in FIG. 5 are denoted by like reference numerals.

The drop-out compensator 30 is composed of a switch 51, a predetermined image generation circuit 52 for generating a video signal representing a predetermined image, for example, a solid-blue image, AND gates 53 and 61, a C signal region detection circuit 54 for detecting a C (color) signal region in the MUSE base band signal based on a frame synchronization signal from the frame synchronization detection circuit 19, a Y signal region detection circuit 55 for detecting a Y (luminance) signal region in the MUSE base band signal based on the frame synchronization signal from the frame synchronization detection circuit 19, OR gates 56, 57 and 60, a frame memory 58, and a predetermined image detection circuit 59 for detecting a video signal output from the predetermined image generation circuit 52.

The operations of the components shown in FIG. 6 will now be described.

The C signal region detection circuit 54 outputs a C signal start detection signal Ci whose output is "1" in a period when samples (12–105 samples) including C signals in the first lines (43rd line and 605th line) in regions where the C (color) signals are present in the MUSE signal shown in FIG. 3 are input, and "0" in other periods, and a C region detection signal Ce whose output is "1" in a period when regions including the C (color) signals are input to the terminal 11 except for the period when the signal Ci is "1", and "0" in other periods.

The Y signal region detection circuit 55 outputs a Y signal start detection signal Yi whose output is "1" in a period when samples (107–480 samples) including Y signals in the first lines (47th line and 609th line) in regions where the C (color) signals are present in the MUSE signal shown in FIG. 3 are input, and "0" in other periods, and a Y region detection signal Ye whose output is "1" in a period when regions including the Y (luminance) signals are input to the terminal 11 except for the period when the signal Yi is "1", and "0" in other periods.

When the Y signal start detection signal Yi or the C signal start detection signal Ci is "1", an output of the OR gate 56 is "1". If a drop-out of the MUSE signal occurs in a period when the output of the OR gate 56 is "1", an output of the AND gate 53 becomes "1". Since both the signals Ce and Ye are "0" at this time, an output of the OR gate 57 is "0" and an output of an AND gate 18 is "0".

Therefore, if a drop-out arises in the first line of a region where the C or Y signal is present, the switch 51 is connected to the "1" side, and the switch 18 is connected to the "0" side. In other words, the signal region where the drop-out occurs is replaced with a predetermined image signal from the predetermined image generation circuit 53, for example, a solid-blue video signal, and input to a 1H delay line 13.

When the Y signal region detection signal Ye or the C signal region detection signal Ce is "1", an output of the OR gate 57 is "1". If a drop-out of the MUSE signal occurs in a period when the output of the OR gate 57 is "1", an output of the AND gate 18 becomes "1".

Therefore, if a drop-out arises in the first line of a region where the C or Y signal is present, a switch 12 is connected to the "1" side, and the signal region where the drop-out occurs is replaced with a video signal of the 1H delay line 13.

If it is assumed that drop-outs occur before and in a region where the C or Y signal is present, all video signals in the regions where the drop-outs occur are replaced with predetermined image signals.

While the region where the C or Y signal is present is input from the terminal 11, either of the signals Yi, Ye, Ci and Ce is "1", and an output of the OR gate 60 also becomes "1". Then, when the image signal replaced by the predetermined image signal is input to the frame memory 58, the predetermined image detection circuit 59 detects the input and outputs "1". At this time, an output of the AND gate 61 also becomes "1". When the output of the AND gate 61 is "1", the frame memory 58 prohibits a signal writing operation.

In other words, when the image signal in the drop-out region replaced with the predetermined image signal is supplied to the frame memory 58, the predetermined image signal is prohibited from being written into the frame memory 58. Reading from the frame memory 58 is always performed and signals in the same portion of a frame are written in the same address. Therefore, the image signal in the drop-out portion replaced by the predetermined image signal is replaced by a video signal in the same position of a previous frame by the frame memory 58. Even if drop-outs occur in a non-image region and an image region, an output image is not deteriorated to a great extent.

As described above, according to an apparatus of the above embodiments, if a succession of drop-outs occur in a plurality of lines including a boundary portion between an image signal and another kind of signal, like a MUSE signal, the image signal is not replaced with a signal other than an image signal, and thereby the deterioration of an output video signal can be prevented.

The individual components shown in outline or designated by blocks in the Drawings are all well known in the image recording arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An apparatus for reproducing, from a recording medium, a composite signal in which an image signal and a non-image signal are multiplexed on a time axis, said apparatus comprising:

(a) reproduction means for reproducing the composite signal from the recording medium;

(b) detection means for detecting a drop-out portion of the composite signal reproduced by said reproduction means;

(c) discrimination means for generating a discrimination signal to discriminate between an image signal portion and non-image signal portions of the composite signal reproduced by said reproduction means; and (d) replacing means for replacing the drop-out portion of the composite signal with a corresponding replacement signal, in response to (i) a detection of a drop-out portion by said detection means and (ii) the discrimination signal generated by said discrimination means, wherein the composite signal is reproduced as synchronization blocks, in which at least one of the image signal portion and the non-image signal portions are arranged in each synchronization block, and said replacing means compensates for a drop-out image signal by using an image signal of the image signal portion in a synchronization block other than the synchronization block including the drop-out image signal.

2. An apparatus according to claim 1, wherein the composite signal recorded on the recording medium comprises an FM-modulated composite signal, wherein said detection means operates in response to the FM-modulated signal reproduced by said reproduction means, and wherein said discrimination means operates in response to a signal obtained by FM demodulation of the FM-modulated signal reproduced by said reproduction means.

3. An apparatus according to claim 1, wherein the composite signal includes the synchronization signal in each of a plurality of the predetermined periods of time, and wherein a non-image synchronization period is present in a synchronization period between synchronization signals when only non-image signals are present.

4. An apparatus according to claim 3, wherein even if a drop-out position is detected by said detection means, said replacing means prohibits the replacement operation with respect to an output of said discrimination means in said non-image synchronization period.

5. An apparatus according to claim 1, wherein the composite signal includes the synchronization signal in each of a plurality of predetermined periods of time, and wherein a mix synchronization period is present in a synchronization period between the synchronization signals when a mix of image signals and non-image signals is present.

6. An apparatus according to claim 5, wherein, in the mix synchronization period, said replacing means prohibits a replacement operation of a non-image signal and executes a replacement operation of the image signal in response to an output portion of said discrimination means when a drop-out is detected by said detection means.

7. An apparatus according to claim 1, wherein said replacing means prohibits a replacement operation of the non-image signal and executes a replacement operation of an image signal in response to an output of said discrimination means when a drop-out portion is detected by said detection means.

8. An apparatus according to claim 1, wherein said replacing means prohibits the replacement operation of the composite signal with a non-image signal and executes a replacement operation of the image signal with another image signal in response to an output of said discrimination means when a drop-out portion is detected by said detection means.

9. An apparatus according to claim 1, wherein said replacing means replaces a portion of the composite signal following the replacement signal, which is a non-image signal, with a predetermined image signal.

10. An apparatus according to claim 9, further comprising:
a detection circuit for detecting a predetermined image signal portion in the composite signal; and
a replacement circuit for replacing the predetermined image signal portion with an image signal, from a same position of a previous frame in response to an output of said detection circuit.

11. An image signal reproducing apparatus, comprising:
(a) reproduction means for reproducing, from a recording medium, a composite signal in which an image signal and a non-image signal are multiplexed on a time axis;
(b) detection means for detecting a drop-out portion of the composite signal reproduced by said reproduction means;
(c) discrimination means for generating a discrimination signal to discriminate between an image signal portion and non-image signal portions of the composite signal reproduced by said reproduction means; and
(d) replacing means for replacing the drop-out portion of the composite signal with a corresponding replacement signal when (i) said detection means detects a drop-out portion in the composite signal and (ii) said discrimination means discriminates an image signal portion,
wherein the composite signal is reproduced as synchronization blocks, in which at least one of the image signal portion and the non-image signal portions are arranged in each synchronization block, and said replacing means compensates for a drop-out image signal by using an image signal of the image signal portion in a synchronization block other than the synchronization block including the drop-out image signal.

12. An image signal reproducing apparatus, comprising:
(a) reproduction means for reproducing, from a recording medium, a composite signal in which an image signal and a non-image signal are multiplexed on a time axis;
(b) discrimination means for generating a discrimination signal to discriminate between an image signal portion and non-image signal portions of the composite signal reproduced by said reproduction means; and
(c) replacing means for replacing a portion of the composite signal with a corresponding replacement signal, in response to the discrimination signal generated by said discrimination means,
wherein the composite signal is reproduced as synchronization blocks, in which at least one of the image signal portion and the non-image signal portions are arranged in each synchronization block, and said replacing means compensates for a drop-out image signal by using an image signal of the image signal portion in a synchronization block other than the synchronization block including the drop-out image signal.

13. A signal processing apparatus comprising:
(a) input means for inputting a composite signal in which a correlation signal and a non-correlation signal are multiplexed on a time axis;
(b) discrimination means for discriminating between a correlation signal portion and a non-correlation signal portion of the composite signal input by said input means; and
(c) compensation means for compensating the composite signal input by said input means in response to an output of said discrimination means,
wherein the composite signal is input as synchronization blocks, in which at least one of the correlation signal portion and the non-correlation signal portions are arranged in each synchronization block, and said compensating means compensates for a drop-out correlation signal by using a correlation signal of the correlation signal portion in a synchronization block other than the synchronization block including the drop-out correlation signal.

14. An apparatus according to claim 13, further comprising detection means for detecting a drop-out portion of the composite signal input by said input means, wherein said compensation means is controlled in response to an output of said detection means.

15. An apparatus according to claim 13, wherein the correlation signal corresponds to an image signal and the non-correlation signal corresponds to an audio signal.

16. An apparatus according to claim 13, wherein the correlation signal corresponds to an image signal and the non-correlation signal corresponds to a control signal.

17. An apparatus according to claim 13, wherein the composite signal includes the synchronization signal in each of a plurality of predetermined periods of time, and wherein a non-correlation synchronization period is present in a synchronization period between the synchronization signals when only the non-correlation signals are present.

18. An apparatus according to claim 13, wherein the composite signal includes the synchronization signal in each of a plurality of the predetermined periods of time, and wherein a mix synchronization period is present in a synchronization period between the synchronization signals when a mix of the correlation signals and non-correlation signals are present.

* * * * *

UNITED STATES PATENT AND TRADEMARK OFFICE
CERTIFICATE OF CORRECTION

PATENT NO. : 5,589,946
DATED : December 31, 1996
INVENTOR(S) : Shimokoriyama, et al.

It is certified that error appears in the above-indentified patent and that said Letters Patent is hereby corrected as shown below:

COLUMN 2

Line 62, "non-image" should read --non-image signal--.

COLUMN 7

Line 5, "position" should read --portion--;

Line 17, "drop-out" should read --drop-out portion--.
line 17, after "output" delete --portion--.

Signed and Sealed this

Twelfth Day of August, 1997

Attest:

BRUCE LEHMAN

*Attesting Officer*  *Commissioner of Patents and Trademarks*